(12) United States Patent  
Wellington

(10) Patent No.: US 8,112,094 B1  
(45) Date of Patent: Feb. 7, 2012

(54) RADIO ACCESS LAYER MANAGEMENT

(75) Inventor: Daniel P. Wellington, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1363 days.

(21) Appl. No.: 11/148,759

(22) Filed: Jun. 9, 2005

(51) Int. Cl.
*H04W 74/00* (2009.01)

(52) U.S. Cl. .......................................... 455/453

(58) Field of Classification Search ............. 455/435.2, 455/436, 448, 446, 437, 438, 439, 440, 441–445, 455/452.2, 453, 522, 69, 552; 370/331, 335, 370/252, 329
See application file for complete search history.

(56) References Cited

U.S. PATENT DOCUMENTS

| | | | |
|---|---|---|---|
| 5,933,782 A * | 8/1999 | Nakano et al. ............ 455/522 |
| 6,181,919 B1 * | 1/2001 | Ozluturk ................... 455/69 |
| 6,374,112 B1 | 4/2002 | Widegren et al. |
| 6,393,286 B1 | 5/2002 | Svensson |
| 6,490,452 B1 * | 12/2002 | Boscovic et al. ......... 455/436 |
| 6,693,952 B1 | 2/2004 | Chuah et al. |
| 6,738,632 B2 | 5/2004 | D'herbemont et al. |
| 6,760,589 B1 | 7/2004 | Hobbis |
| 6,782,270 B1 | 8/2004 | Jeschke et al. |
| 6,826,193 B1 | 11/2004 | Peisa |
| 6,853,648 B1 | 2/2005 | Krstanovski et al. |
| 7,174,185 B2 * | 2/2007 | Sato et al. ................ 455/522 |
| 2002/0019231 A1 * | 2/2002 | Palenius et al. .......... 455/437 |
| 2002/0052206 A1 * | 5/2002 | Longoni ................... 455/453 |
| 2003/0125039 A1 * | 7/2003 | Lachtar et al. ............ 455/453 |
| 2004/0014436 A1 * | 1/2004 | Lipka et al. .............. 455/112 |
| 2004/0259565 A1 * | 12/2004 | Lucidarme ................ 455/453 |
| 2006/0111041 A1 * | 5/2006 | Karabinis ................. 455/13.4 |
| 2006/0156157 A1 * | 7/2006 | Haselden et al. ......... 714/746 |
| 2006/0166677 A1 * | 7/2006 | Derakshan et al. ....... 455/453 |
| 2006/0203923 A1 * | 9/2006 | Costa et al. .............. 375/260 |

* cited by examiner

*Primary Examiner* — Melody Mehrpour

(57) ABSTRACT

Architecture that efficiently adds additional carrier(s) (e.g., UMTS) to a wireless operator's network which allows the additional carrier(s) network to co-exist with other technologies by sharing the spectrum in geographically adjacent sites. When employing UMTS, the UMTS is CDMA-based such that all users utilize the same frequency 5 MHz band. With this innovation, additional carriers (e.g., a $2^{nd}$ 5 MHz UMTS carrier) can be added when capacity is needed on a site-by-site basis without clearing an additional 5 MHz of spectrum.

40 Claims, 12 Drawing Sheets

RADIO ACCESS LAYER MANAGEMENT

BACKGROUND

Mobile data communications is evolving quickly because of global communications network such as the Internet, intranets, laptops, PDAs (personal digital assistants) and increased requirements of workforce mobility. Third generation mobile system (3G) technologies (e.g., UMTS-Universal Mobile Telecommunications System) are considered enhancements to GSM (Global System for Mobile telecommunications) cellular standards.

New technologies are required to deliver high speed location and mobile terminal specific content to users. The emergence of new technologies thus provides an opportunity for a boom similar to what the computer industry had in 1980's, and that Internet and wireless voice had in 1990's.

UMTS can be considered to be the commercial convergence of fixed line telephony, mobile, Internet and computer technology. The UMTS transport network is preferred when handling high data traffic. Conventionally, a spectrum is cleared for various technologies on a marketwide basis. For GSM and TDMA (time division multiple access) technologies which require re-use plans, the channel bandwidth is relatively small, 200 and 30 KHz respectively, thus wasting 200 or 30 KHz of spectrum is not problematic. However, the UMTS carrier is 5 MHz wide so clearing such a large amount of spectrum on a marketwide basis when many UMTS sites do not yet need additional carrier capacity wastes precious spectrum.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture is a software algorithm that efficiently adds additional UMTS carriers to a wireless operator's network which allows the UMTS network to co-exist with other technologies by sharing the spectrum in geographically adjacent sites. The UMTS is CDMA-based such that all users utilize the same frequency 5 MHz band. With this innovation, additional carriers (e.g., a $2^{nd}$ 5 MHz UMTS carrier) can be added when capacity is needed on a site-by-site basis without clearing an additional 5 MHz of spectrum. This software can reside entirely in the radio access node and/or a RNC (radio network controller) product.

As disclosed and claimed herein, in one aspect thereof, the innovation includes a system that facilitates carrier management in a cellular network. A cell is provided that employs a first carrier for cellular services. A carrier component dynamically enables a second carrier in the cell based in part on congestion loading of the first carrier.

In another aspect thereof, a traffic management component is provided that monitors cell traffic on one or more of the operational carriers. When congestion in the one or more carriers reaches a predetermined level, another carrier can be automatically added to handle the overload.

In yet another aspect thereof, a trigger component is provided that monitors one or more parameters that trigger enablement of an additional carrier in the cell over the existing carriers that currently exist in operation.

In still another innovative aspect, when congestion of the existing carriers subsides or is reduced, the carrier component can automatically reduce the number of carriers in the cell such that only carriers that are needed to carry traffic, are deployed.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
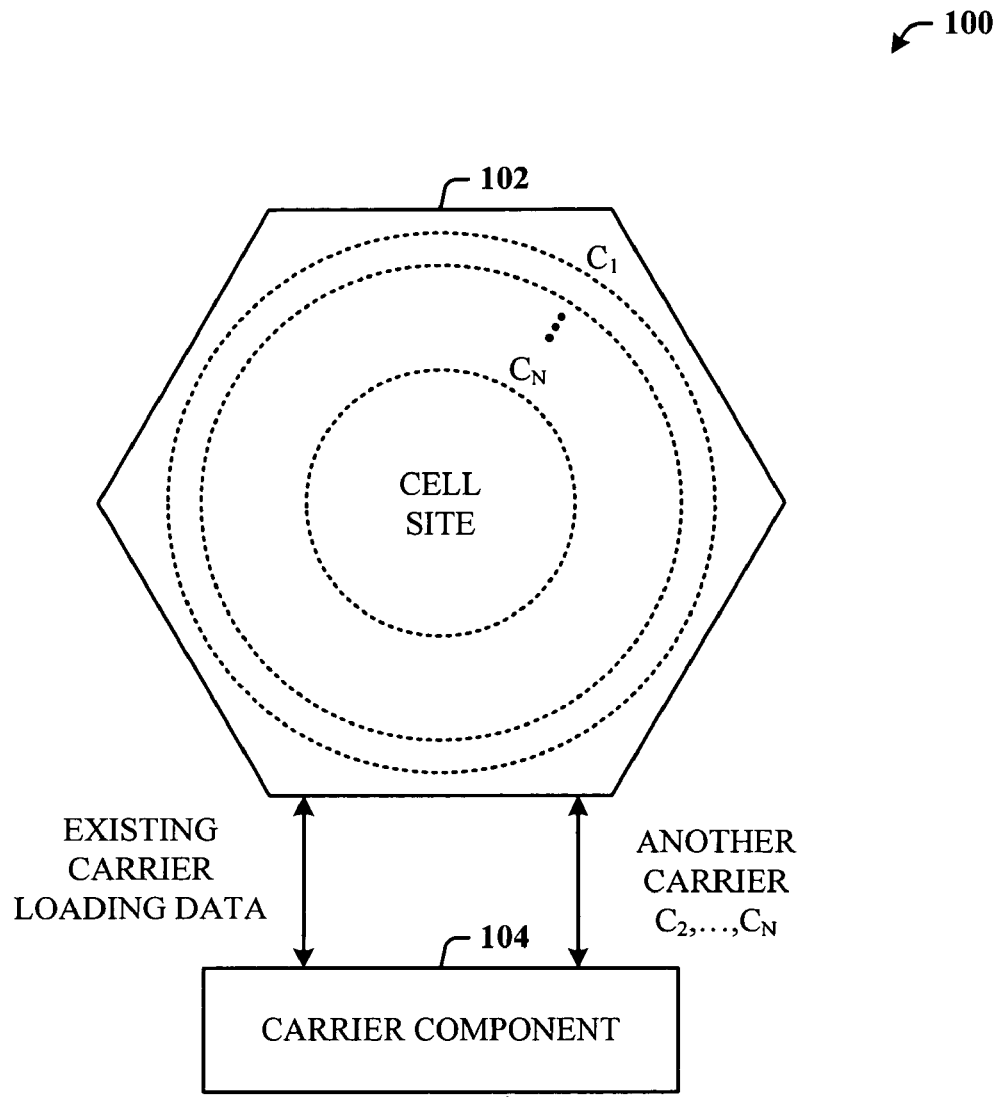
FIG. 1 illustrates a system that facilitates multi-carrier implementation in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The disclosed architecture facilitates optimal UMTS (Universal Mobile Telecommunications System) radio layer management (URLM) that leads to spectral efficiencies on both GSM (Global System for mobile telecommunications) and UMTS networks. The subject innovation provides higher spectrum efficiency by increasing UMTS capacity on high capacity sites. On a site-by-site basis, the subject innovation provides a capacity increase of about 100% when adding a second UMTS carrier, and about 50% when adding a third UMTS carrier, etc. UMTS is CDMA-based such that all users can utilize the same 5 MHz frequency band. Near optimum use of a combined spectrum can be provided during transition years between carriers, for example, GSM (global system for mobile telecommunications) and UMTS. Concept is also applicable to the addition of the 3rd UMTS carrier.

The innovation provides for enhanced enterprise experience. With enterprise users requiring higher data rates and capacity (e.g., 384 kb and HSDPA-High Speed Downlink Packet Access), second or even third 5 MHz blocks can be added in very specific areas without negatively impacting surrounding sites. Parameter settings can be uniformly set by market engineers with little need for continued drive testing or continued site by site analysis. For special events requiring heavy voice and data usage that may exceed a single carrier's capacity, this can be achieved much easier with a second UMTS carrier on the same sector rather than adding a second cell on wheels (COW), for example. Additionally, the innovation allows flexibility in placing voice and traffic on whichever UMTS or GSM/EDGE (enhanced data for GSM evolution) layers that make sense.

In one implementation, an additional UMTS carrier (denoted U') can be assigned to the inner layer in order to simultaneously share the 5 MHz spectrum with surrounding GSM cell sites. Impacts to GSM are minimized because the additional UMTS carrier is a broadband interferer to GSM with about a 15 dB spreading factor, is lower power than the primary UMTS carrier, for example, and is further separated geographically in distance from its GSM neighbors. Impacts to UMTS are minimized from GSM because GSM uses hopping frequencies in this 5 MHz band, and they are further separated geographically due to small UMTS coverage area.

A 5-6 dB reduction in the added UMTS layer results in about 50% of the maximum serving area of primary UMTS carrier U, which is still a large amount of traffic. In one implementation, it can be feasible in some areas to reduce coverage by 10 dB. It is to be appreciated that if the correlation between peak GSM traffic levels and UMTS traffic levels in the same area is not 100% correlated, then the benefits of URLM are even more significant. In one implementation, algorithms can be developed that target low mobility users for the added carrier U' layer first, before the primary layer U. This minimizes the handovers between U' and U layers. In another implementation, a method of obtaining additional carrier U' coverage is to use soft (but not softer) handover as a trigger for ascension to the primary U layer.

Referring initially to the drawings, FIG. 1 illustrates a system 100 that facilitates multi-carrier implementation in accordance with the subject innovation. There is provided a cell 102 in which at least one carrier (denoted $C_1$) is employed to provide cellular communications. The cell 102 allows for high traffic communications including data, streaming voice, streaming video, etc. Since a cell carrier can only handle so much data, it is possible for the cell carrier to become congested or overloaded. In accordance with an innovative aspect, a carrier component 104 is provided that monitors carrier traffic in the cell 102. An input to the carrier component 104 can be the existing carrier loading data that describes the amount of congestion on the carrier ($C_1$). When the carrier ($C_1$) becomes congested to where additional callers cannot be allowed to connect (are blocked), the carrier component 104 facilitates the deployment of an additional carrier (e.g., $C_2$) in the cell 102 that operates in the same spectrum as the first carrier ($C_1$). Similarly, if both the first and second carriers become congested, a third carrier can be deployed, and so on, to an Nth carrier, denoted $C_N$.

The carrier component 104 can operate dynamically such that deployment of additional carriers can occur dynamically based on traffic congestion at any given moment in time. For example, as described supra, when congestion of an existing carrier is high such that blocking can occur, the carrier component 104 automatically deploys an additional carrier (e.g., the $2^{nd}$ carrier $C_2$). When cell congestion decreases such that all traffic can be handled by the first carrier or the previous set of carriers, the carrier component 104 causes the last added carrier to be disabled or removed from operation. This carrier reduction can occur in combination with corresponding reductions in cell congestion until the cell 102 is operating only with the original carrier. Thus, carrier deployment and removal can occur quickly to handle dynamically changing characteristics in cell congestion.

The cell 102 includes a cell site (denoted CELL SITE), which is the location where the wireless antenna and network communications equipment is placed. A cell site can consist of a transmitter/receiver, antenna tower, transmission radios and radio controllers, and is typically operated by a wireless service provider.

Figure 2:
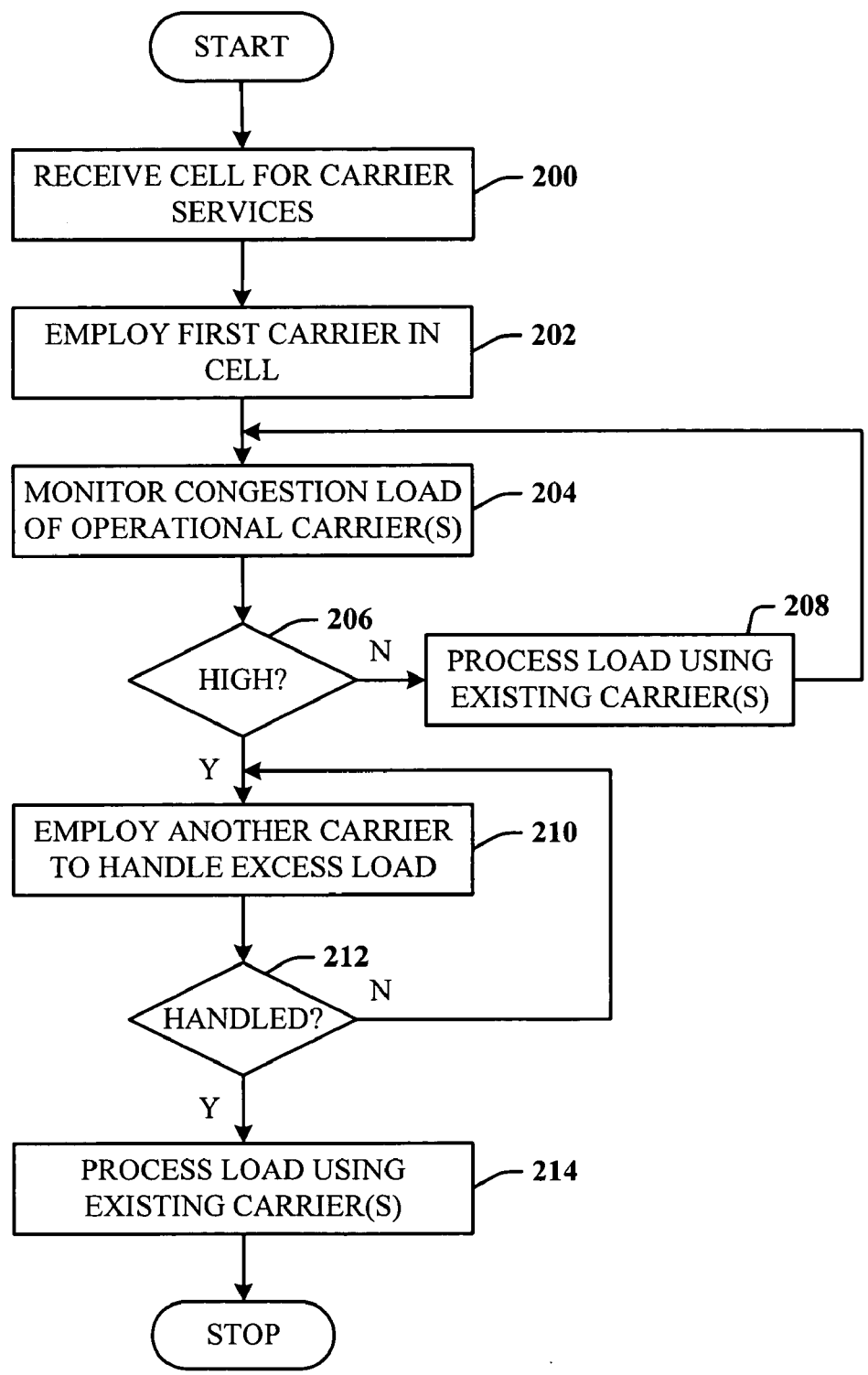
FIG. 2 illustrates a methodology of managing cell congestion by adding a carrier according to an innovative aspect.

FIG. 2 illustrates a methodology of managing cell congestion by adding a carrier according to an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a cell is received for carrier services. At 202, a first carrier is deployed in the cell for normal cellular communications. At 204, cell congestion is monitored on the operational carrier(s). At 206, the system determines if the congestion is high such that an additional carrier should be added to handle the overflow from the existing carrier or set of carrier(s). If not, flow is to 208 to continue processing the load utilizing the existing carrier or set of carriers. Flow is then back to 204 to continue monitoring congestion in the cell.

If, however, congestion is high, flow is from 206 to 210 where another carrier is deployed to handle the excess load. At 212, the system monitors the cell to determine if the current carriers are handling the congestion. If not, flow is back to 210 to deploy another carrier. This process can continue until there are sufficient carriers deployed to handle the cell traffic. If the cell traffic is being handled by the addition of the last carrier, flow is from 212 to 214 to process the cell traffic with the existing carriers.

Figure 3:
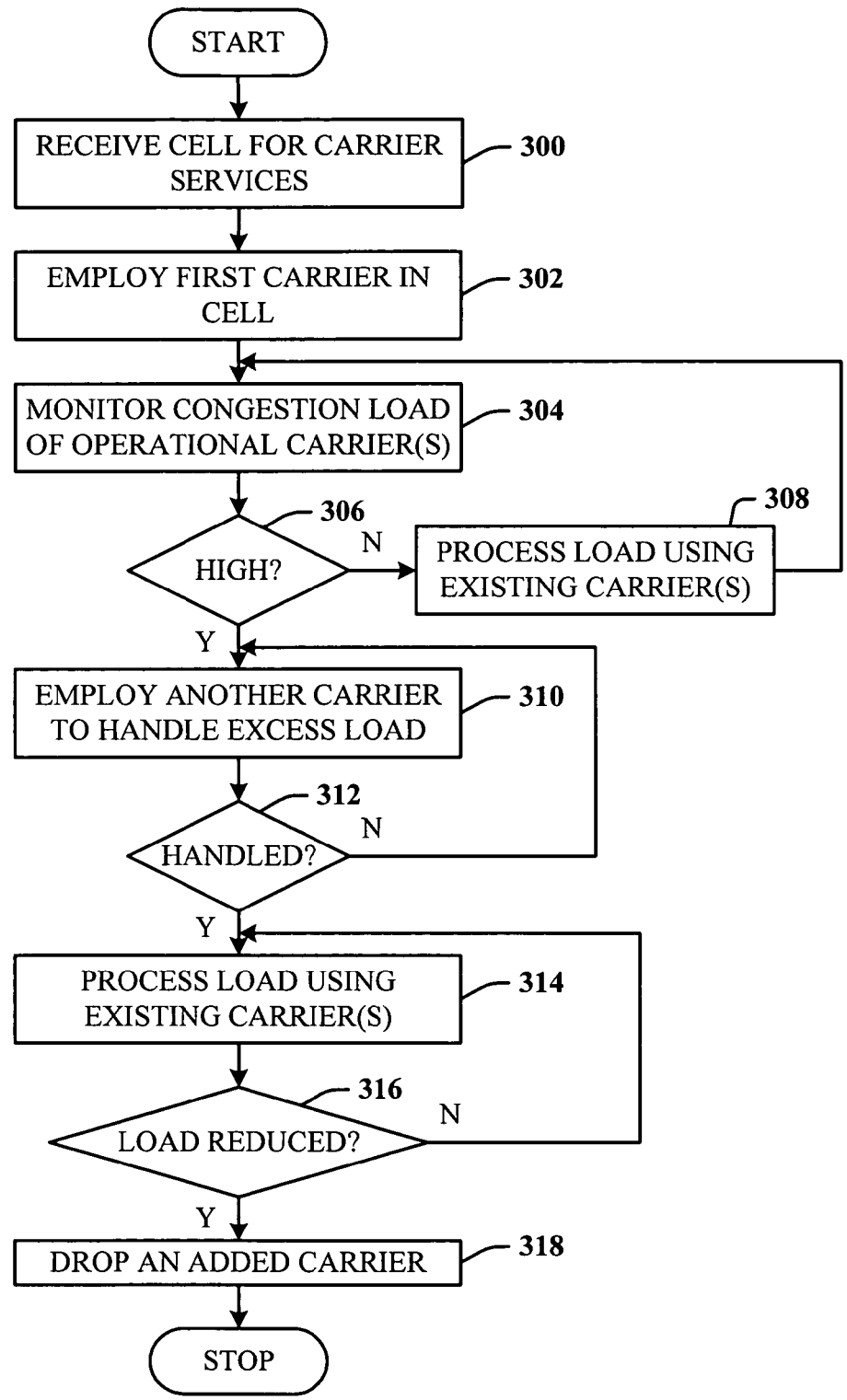
FIG. 3 illustrates a methodology of managing cell congestion by dynamically adding and reducing the number of carriers according to an innovative aspect.

FIG. 3 illustrates a methodology of managing cell congestion by dynamically adding and reducing the number of carriers according to an innovative aspect. At 300, a cell is received for carrier services. At 302, a first carrier is deployed in the cell for normal cellular communications. At 304, cell congestion is monitored on the operational carrier(s). At 306, the system determines if the congestion is high such that an additional carrier should be added to handle the overflow from the existing carrier or set of carrier(s). If not, flow is to 308 to continue processing the load utilizing the existing carrier or set of carriers. Flow is then back to 304 to continue monitoring congestion in the cell.

If, however, congestion is high, flow is from 306 to 310 where another carrier is deployed to handle the excess load. At 312, the system monitors the cell to determine if the current carriers are handling the congestion. If not, flow is back to 310 to deploy another carrier. This process can continue until there are sufficient carriers deployed to handle the cell traffic. If the cell traffic is being handled by the addition of the last carrier, flow is from 312 to 314 to process the cell traffic with the existing carriers. At 316, the system determines if the existing cell congestion is reduced such that an existing carrier can be removed. If not, flow is back to 314 to continue processing the existing cell traffic. If the load is reduced sufficiently that a previously added carrier is no longer required, flow is from 316 to 318 to drop or remove a carrier from operation. In one implementation, this occurs dynamically. In another implementation, this can occur manually, such that a message is sent to an administrator that indicates that one carrier can be removed due to reduced cell congestion.

Figure 4:
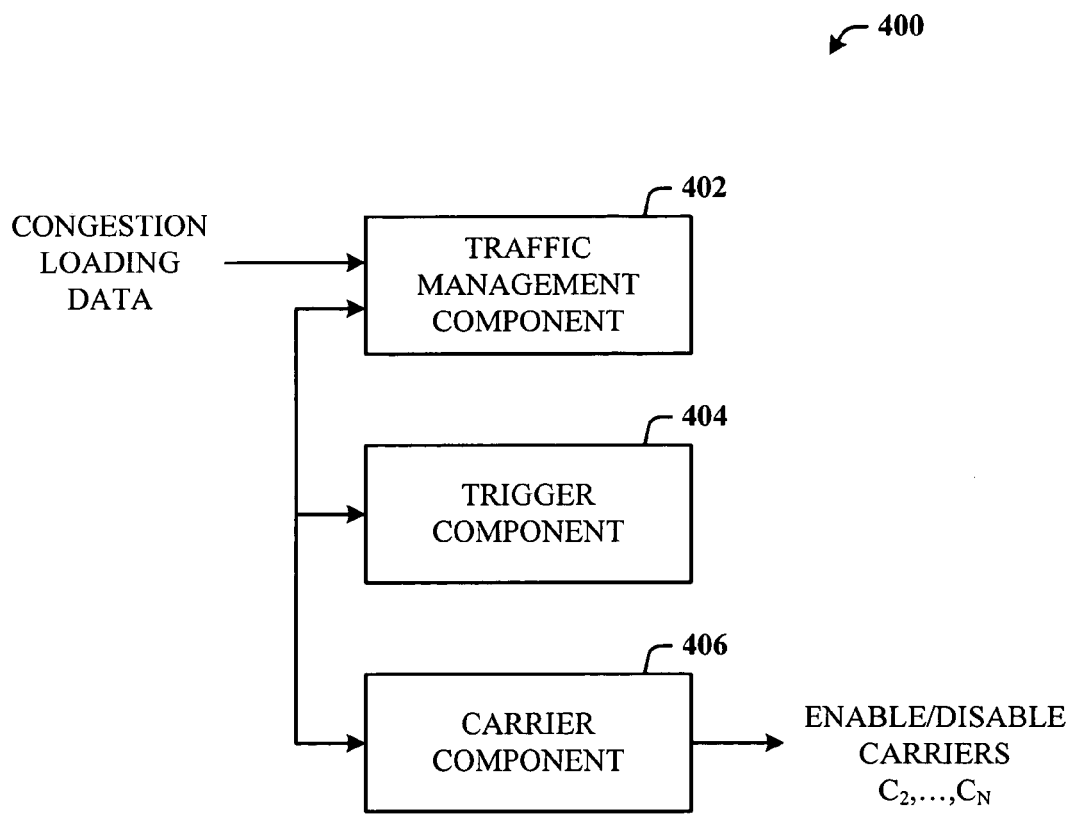
FIG. 4 illustrates a block diagram of a system that facilitates carrier management in a communications cell in accordance with another aspect of the innovation.

FIG. 4 illustrates a block diagram of a system 400 that facilitates carrier management in a communications cell in accordance with another aspect of the innovation. The system 400 includes a traffic management component 402 that monitors carrier congestion for all carriers deployed in the cell. The subject innovation also applies to a scenario whereby a second carrier is manually added on a site-by-site basis. The RSCP (received signal code power) and CPICH Ec/No can be utilized, but the automatic congestion control is not a strict requirement. A trigger component 404 monitors one or more triggers which indicate that congestion in the existing carrier or carriers is at a point that requires an additional carrier. The triggers can be related to CPICH Ec/No, for example, for the serving cell and neighboring cells, and RSCP values that allow for fine tuning. Ec/No is the ratio of desired received power per chip to receive power density in the power band. CPICH is the Common Pilot Channel. This channel is used in UMTS to enable channel estimation. The CPICH uses a predefined bit sequence, and has a fixed rate of 30 Kbps with a spreading factor of 256. This allows the UE (User Equipment) to equalize the channel in order to achieve a phase reference with the SCH (Synchronization Channel) and also allows estimations in terms of power control. The same channel code is always employed on the primary CPICH.

A carrier component 406 (similar to carrier component 104) then deploys (enables) additional carriers (denoted $C_2, \ldots, C_N$). As indicated supra, the carrier component can also remove (or disable) a carrier that had previously been added when the cell congestion is sufficiently low to warrant removal.

Figure 5:
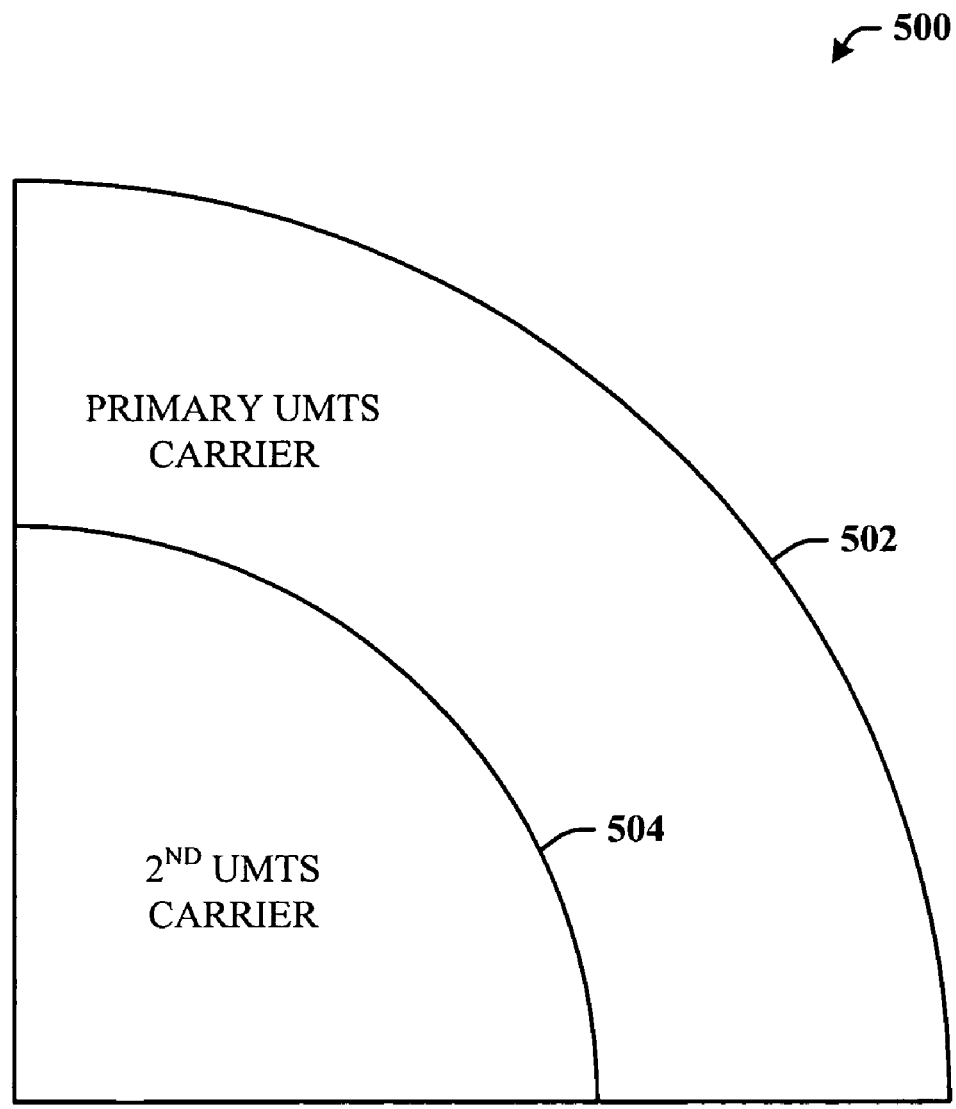
FIG. 5 illustrates a partial cell that depicts carrier management in accordance with an aspect.

FIG. 5 illustrates a partial cell 500 that depicts carrier management in accordance with an aspect. The cell 500 is initially made operational using a primary carrier 502 that this case, is UMTS. When congestion is detected on the primary carrier 502, an additional (or second) UMTS carrier 504 is deployed along with the primary UMTS carrier 502. Again, this can occur statically, such that the second carrier 504 stays operational. Alternatively, carrier management is such that the second UMTS carrier 504 is enabled dynamically to handle the excess congestion of the primary UMTS carrier 502. Once the excess congestion recedes, the second carrier 504 is disabled, and the only operational carrier is the primary UMTS carrier 502.

In most voice and data wireless networks, traffic level comparisons across cell sites shows significant non-uniformity. Sites with the highest traffic levels experience hard blocking many months and even years before neighboring sites. The congestion can be solved through the addition of capacity sites, lowering of quality metrics, and adding new spectrally efficient technologies such as UMTS. The subject invention of UMTS radio layer management allows the introduction of the second (or additional) UMTS carriers (U') on a site-by-site basis, rather than clearing another 5 MHz of spectrum throughout the entire market. The second or additional carriers can be introduced by restricting coverage area closer to cell site of the cell, as indicated in FIG. 1.

Figure 6:
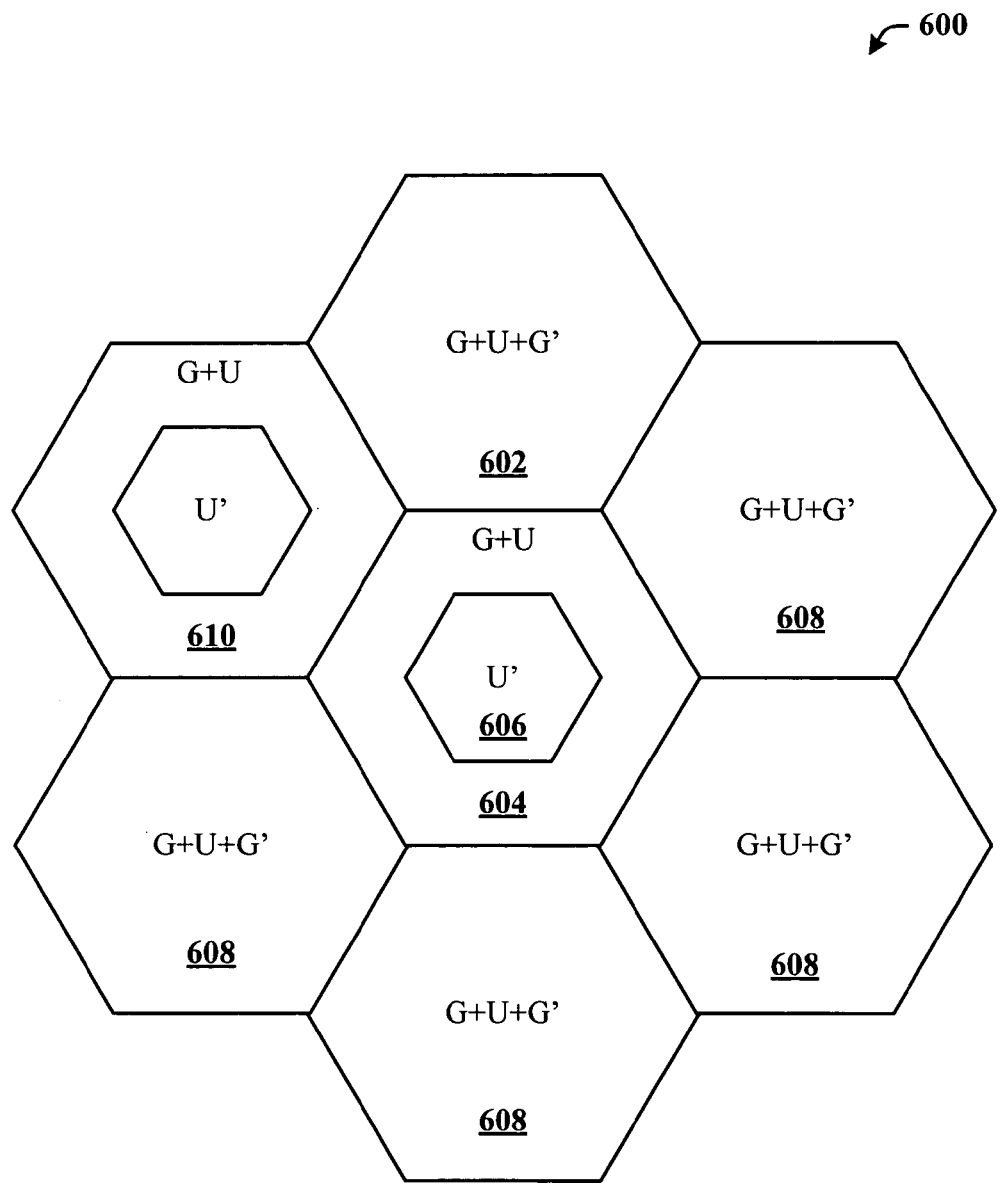
FIG. 6 illustrates cell group of seven cells each of which employs carrier management in accordance with the disclosed innovation.

Referring now to FIG. 6, there is illustrated cell group 600 of seven cells each of which employs carrier management in accordance with the disclosed innovation. In this implementation, GSM (Global Systems for Mobile Telecommunications) band services (denoted G) and UMTS band services (denoted U) are totally separate bands that are being utilized. U is denoted the first UMTS carrier which is separate in frequency and band from the G carrier. What is desired is the sharing of one band between cell sites, for example, a cell 602 and a cell 604. In other words, an additional GSM frequency (denoted G') and then a second UMTS carrier (denoted U') are of a single band that is shared between sites. Essentially, there are now three operational bands: G, U and U'. In the inner-region of cell site 604, the second UMTS carrier 606 is deployed, and designated in the U' prime band. Within that cell site 604, G+U bands serve traffic on the outer edge of the cell 604.

At neighboring cells, for example, cells 608, bands G+U are again utilized. Also, band G' can be used, which is the GSM frequencies that are sharing the band with the second UMTS carrier. Additionally, frequencies can be used in a cell immediately adjacent to the cell 604 and a cell 610 in which the carrier management is employed. In this particular embodiment, five neighboring cells are configured to operate as normal, and can share that second UMTS carrier band U'.

As an example, the cell 610 is shown adjacent to the center cell 604 and also includes the same configuration. All of these cells (602, 604, 608 and 610) can have the exact same configuration. Alternatively, all cells but one could have the G+U+G' band configuration. The innovation is sufficiently flexible for deployment in many different scenarios.

In operation, prior to adding the second UMTS carrier U', the two sites (604 and 610) are experiencing high blocking, and through the use of inter-RAT (radio access technology) algorithms have had traffic pushed back to GSM to ease congestion on the first (or primary) UMTS carrier. RAT indicates the type of radio technology to access the CN (core network). Example technologies include UTRA (UMTS Terrestrial Radio Access), CDMA2000™, DECT (Digital Enhanced Cordless Technology), and GERAN (GSM EDGE Radio Access Network). Once the second UMTS carrier U' is added, inter-RAT algorithms should be changed in those two cells (604 and 610) to aggressively push dual mode GSM/UMTS traffic to the UMTS layers. A goal in setting thresholds is to avoid G' to U' interference. The exact backoff settings for the second UMTS layer U' can be user-defined, and can be a flexible set of triggers based on CPICH Ec/No and RSCP, for example. After the second UMTS carrier U' is added, all cells are now are co-sited, G and U are separate bands, and G' and U' are one band shared between cell sites.

Figure 7:
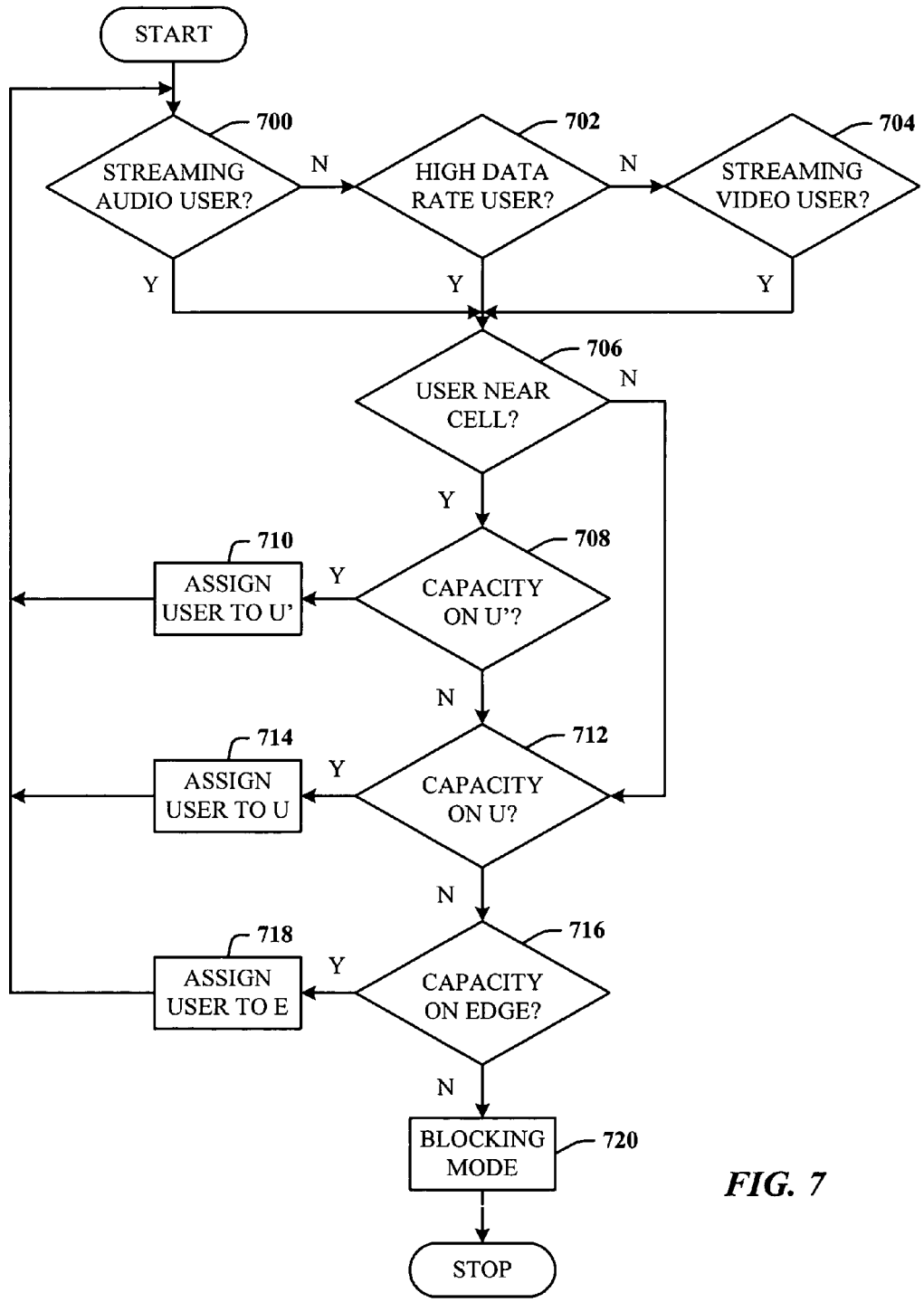
FIG. 7 illustrates a methodology of assigning users of data when utilizing two carrier technologies in accordance with an innovative aspect.

FIG. 7 illustrates a methodology of assigning users of data when utilizing two carrier technologies in accordance with an innovative aspect. This particular methodology utilizes three major data services of streaming video, streaming audio, and high data-rate users, and already employs a second carrier. At 700, it is checked if the user is a streaming audio user. If not, flow is to 702 to determine if the user is a high data-rate user. If not either of the first two, the system checks to determine if the user is a streaming video user. In any case, if the user falls into one of the categories, flow is to 706 to determine if the user is near a cell that deploys the carrier management architecture of the subject innovation. If so, flow is to 708 to check for available capacity on the added carrier U'. If there is available capacity, at 710, the user is assigned to the added carrier U'. Flow is then back to 700 to process the next user.

If, however, there is no available capacity on the added carrier U', flow is from 708 to 712 to check for available capacity on the primary carrier U. If there is available capacity, the user is assign to the primary carrier U, at 714, and flow returns back to 700 to process the next user. If, however, there is no available capacity on the primary carrier U, then flow is from 712 to 716, to check for available capacity on the GSM EDGE carrier E. If so, flow is to 718 to assign the user to the E band, with flow returning thereafter to 700 to process the next user. If there is no available capacity on the EDGE carrier, flow is to 720 to block the user. Additionally, if the user is not near a cell that can handle the user services, flow is from 706 to 712 to attempt to assign the user on the original UMTS layer U, or the EDGE layer E, before blocking.

Note that this particular methodology processes the user against an already available added UMTS carrier U'. Moreover, the user is processed against the added carrier before the primary UMTS carrier U. This need not be the case, as the system can be deployed in any desirable manner.

Figure 8:
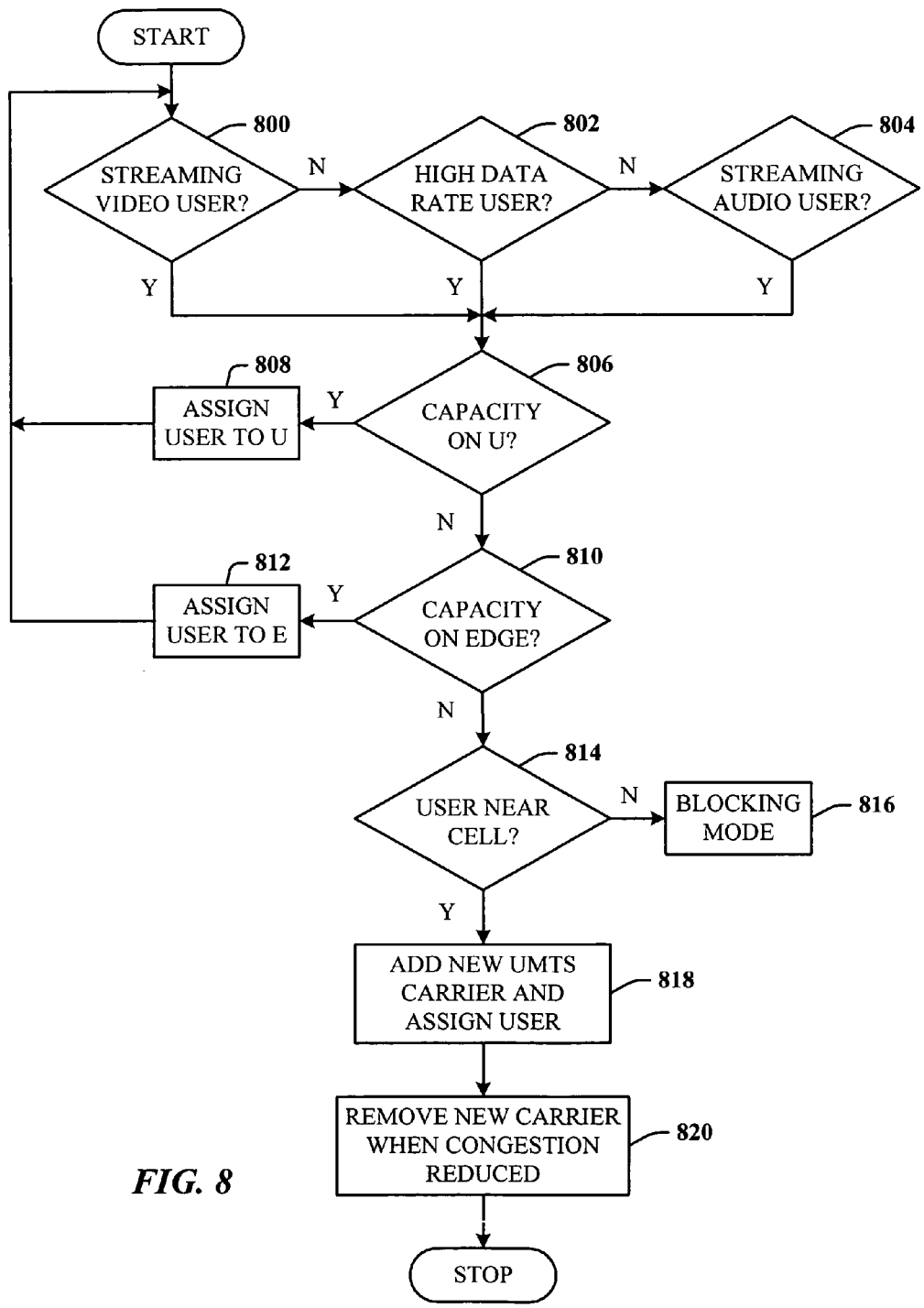
FIG. 8 illustrates an alternative methodology of assigning users of data when utilizing UMTS and GSM EDGE carrier technologies in accordance with an innovative aspect.

FIG. 8 illustrates an alternative methodology of assigning users of data when utilizing UMTS and GSM EDGE carrier technologies in accordance with an innovative aspect. In this scenario, the system tests for a streaming video user before the streaming audio user. Additionally, the additional carrier has not been initially deployed. At 800, it is checked if the user is a streaming video user. If not, flow is to 802 to determine if the user is a high data-rate user. If not either of the first two, the system checks to determine if the user is a streaming audio user. In any case, if the user falls into one of the categories, flow is to 806 to determine if the there is capacity on the primary UMTS carrier U. If so, flow is to 808 to assign the user to the primary carrier U. Flow is then back to 800 to process the next user. If there is no available capacity on U, flow is from 806 to 810 to check for available capacity on the EDGE carrier E. If there is available capacity, at 812, the user is assigned to the carrier E. Flow is then back to 800 to process the next user.

If, however, there is no available capacity on the EDGE carrier E, flow is from 810 to 814 to check if the user is near a cell. If not, the user call is blocked, as indicated at 816. If the user is near a cell, flow is from 814 to 818 to add a new UMTS carrier U''' and assign the user to this added carrier U'''. At 820, the added carrier can then be automatically removed when congestion is reduced, or removed manually.

Note that this particular methodology first processes the user against the primary UMTS carrier U, and then the other carrier technology. Finally, if needed, the methodology adds another UMTS carrier to handle the excessive load. Again, this is not a requirement, as the system can be deployed in any desirable manner.

Figure 9:
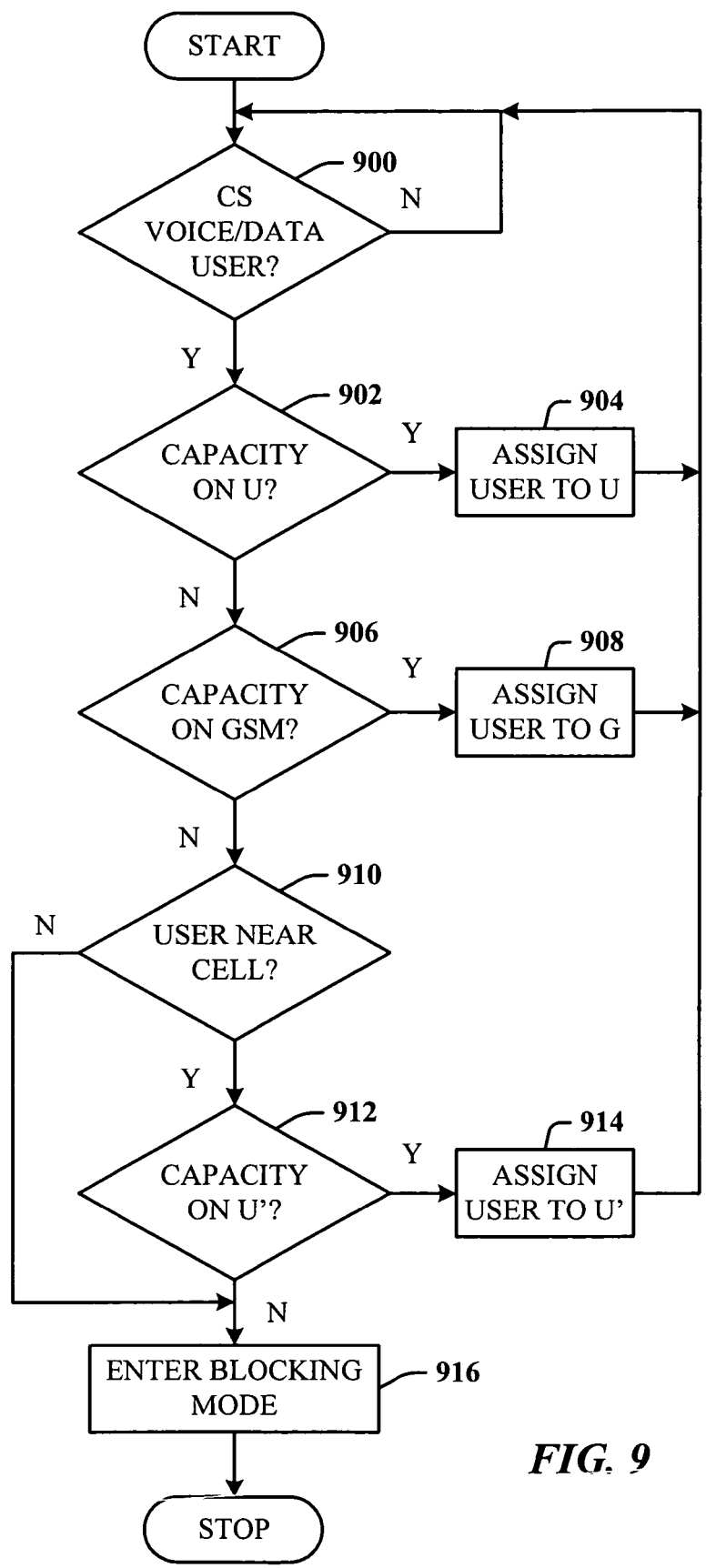
FIG. 9 illustrates an alternative methodology of assigning users of voice data when utilizing UMTS and GSM carrier technologies in accordance with an innovative aspect.

FIG. 9 illustrates an alternative methodology of assigning users of voice data when utilizing UMTS and GSM carrier technologies in accordance with an innovative aspect. At 900, the system checks to determine if the user is a circuit-switched voice/data user. If not, flow loops back to the input to continue checking the accessing user. If so, flow is from 900 to 902 to then check if there is capacity on the primary UMTS carrier U. If so, at 904, the user is assigned to the primary carrier U, and flow is back to the input of 900. If not, flow is from 902 to 906 to check if there is available capacity on the GSM carrier G. If yes, at 908, the user is assigned to the GSM carrier G, and flow returns back top 900 to process the next user.

If there is no available capacity on the GSM carrier G, flow is from 906 to 910 to check for a nearby cell. If there is, flow is from 910 to 912 to then check for capacity on an added UMTS carrier U' of the nearby cell. If yes, at 914, the user assigned to the added carrier U', and flow then returns back to 900 to process the next user. If there is no capacity on the added carrier U', the user is blocked from access, as indicated at 916. Similarly, if the user is not near a cell, flow is from 910 to 916 to block user access to the cell.

Figure 10:
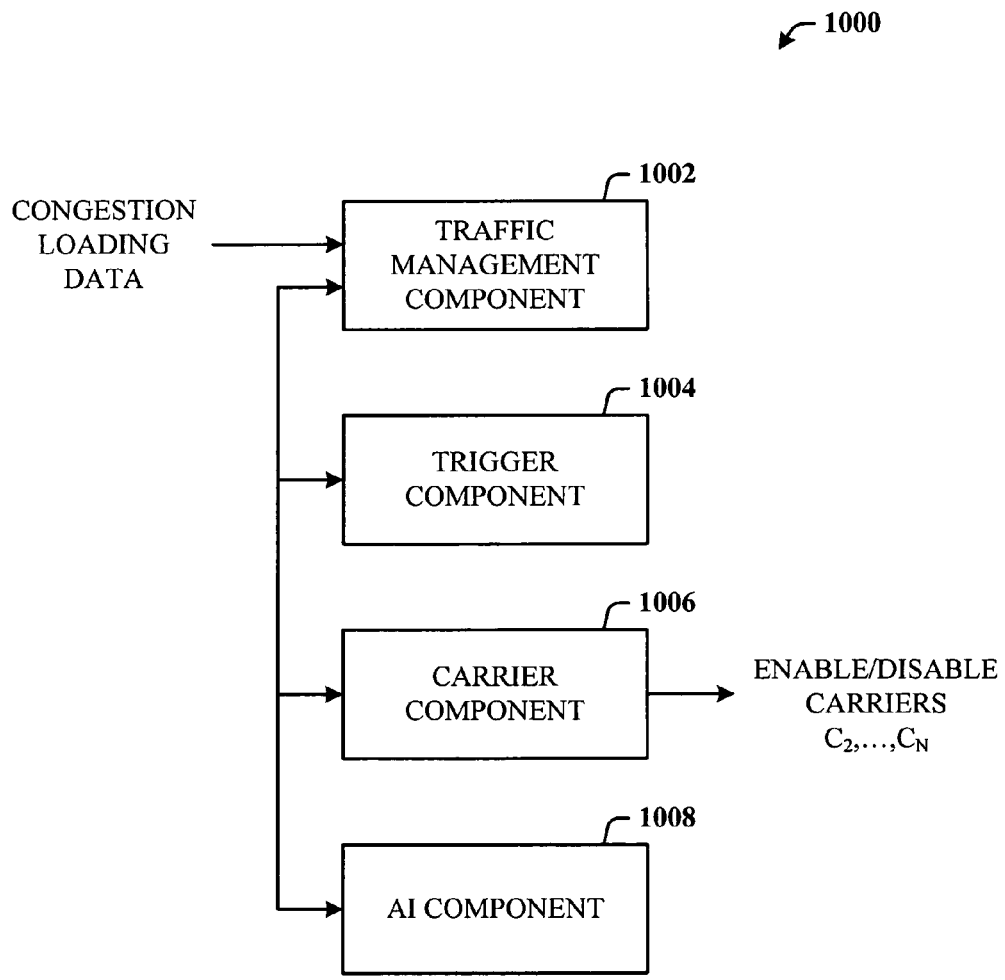
FIG. 10 illustrates a system that employs an artificial intelligence which facilitates automating one or more features in accordance with the subject innovation.

FIG. 10 illustrates a system 1000 that employs an artificial intelligence (AI) which facilitates automating one or more features in accordance with the subject innovation. The system 1000 includes a traffic management component 1002 (similar to traffic component 402 of FIG. 4) that monitors carrier congestion for all carriers deployed in the cell. A trigger component 1004 (similar to trigger component 404 of FIG. 4) monitors one or more triggers which indicate that congestion in the existing carrier or carriers is at a point that requires an additional carrier. The triggers can be related to CPICH Ec/No, for example, for the serving cell and neighboring cells, and RSCP values that allow for fine tuning. A carrier component 1006 (similar to carrier components 104 and 406) then deploys (enables) additional carriers (denoted $C_2, \ldots, C_N$). As indicated supra, the carrier component can also remove (or disable) a carrier that had previously been added when the cell congestion is sufficiently low to warrant carrier removal.

An AI component 1008 can monitor any or all of the traffic management component 1002, trigger component 1004 and carrier component 1006 to facilitate automation of various aspects and features of the subject innovation.

The subject invention (e.g., in connection with selection) can employ various AI-based schemes for carrying out various aspects thereof. For example, a process for determining when to deploy an additional carrier can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions.

In one implementation, the AI component 1008 can be employed to monitor congestion such that when the carrier congestion is sufficiently low, a previously added carrier can be removed. Alternatively, the AI component 1008 can determine that although the congestion parameters indicate that the added carrier can be disabled or removed, from analysis and processing of historical data that as been stored, the added carrier should be retained since there is a high degree of likelihood that given the time of day, for example, the additional carrier will be need shortly. Thus, this will be handled automatically given additional information about the usage, location, and other available information that has been acquired and processed over time.

In another example, the AI component 1008 monitors the congestion and when the congestion parameters indicate that deployment of an additional carrier should occur, the AI component can override this process. This can be based on analysis and computing of past data which can indicate that the load will subside shortly. Thus, access by a user will be momentarily denied, but a second try by the user will likely by successful due to the expected short duration of the excessive congestion, as computed by the AI component 1008.

In yet another example, the AI component 1008 continually or periodically processes stored user data, cell data, data types (e.g., audio versus video), and so on, which can indicate trends in usage and traffic for a particular location, time of day, week, month (e.g., holiday, season, . . . ). Based on the trend data, the AI component 1008 learns and automates user assignments from a primary UMTS carrier to an added UMTS carrier, from a primary UMTS carrier to a GSM carrier, and so on. This can be based on user profiles that have been developed over repeated use by a user, for example. Thus, it can be appreciated that the AI component 1008 can learn and automate many different features and aspects of the subject innovation.

Figure 11:
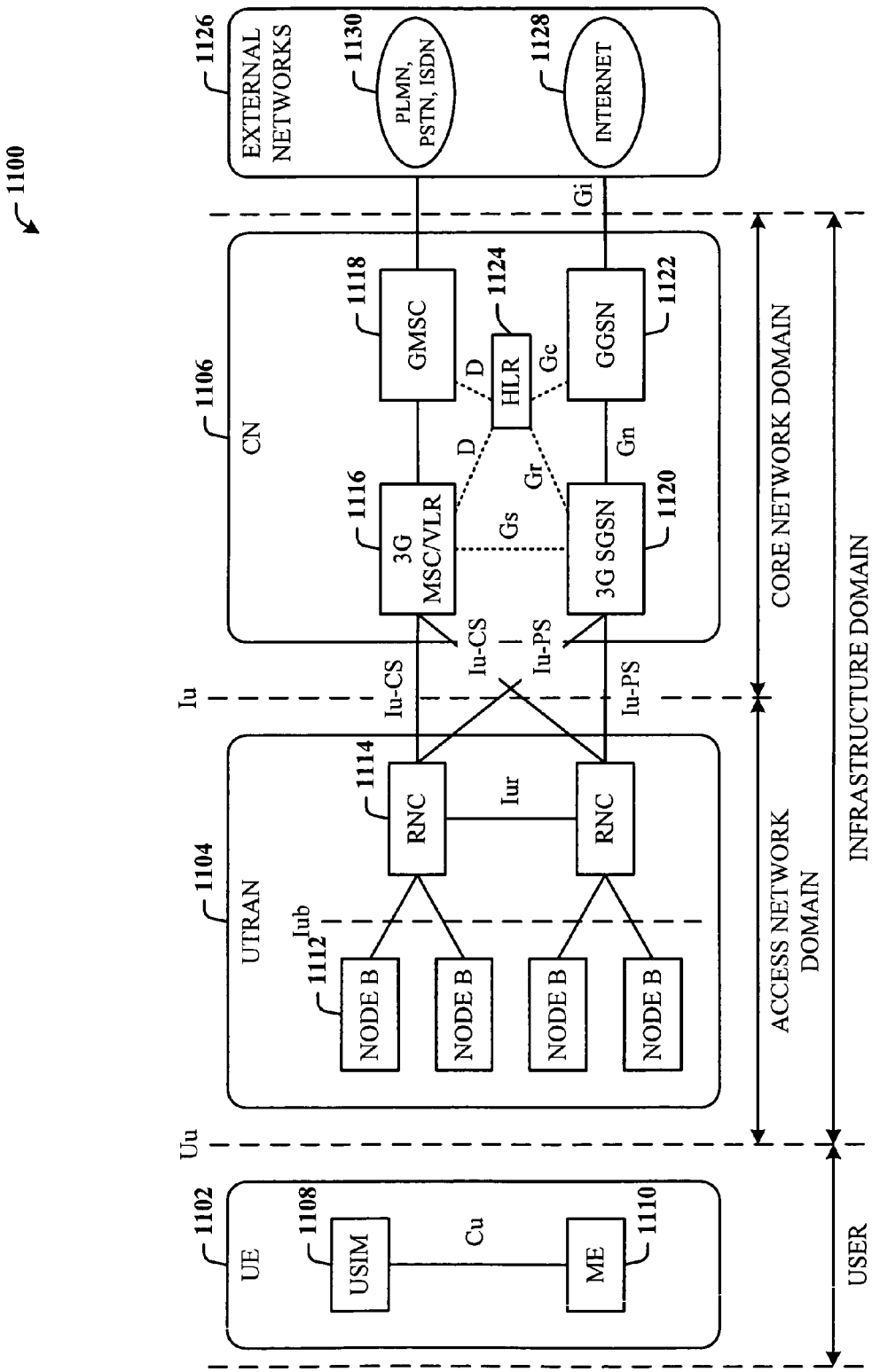
FIG. 11 illustrates an exemplary UMTS network that facilitates carrier management in accordance with the subject innovation.

FIG. 11 illustrates an exemplary UMTS network 1100 that facilitates carrier management in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS—Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 1116 and gateway MSC (GMSC) 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSCNLR entity 1116 of the CN 1106 for voice from/to the MSCNLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSCNLR 1116 and the SGSN. A Gn interface is provided between the SGSN 1120 and the GGSN 1122. A D interface is provided between the MSCNLR 1116 and the HLR 1124, and the HLR 1124 and the GMSC 1118. A Gr interface is provided between the SGSN 1120 and the HLR 1124. A Gc interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSCNLR and SGSN can merge to become a UMTS MSC.

Summarizing the UMTS frequencies, 1920-1980 MHz and 2110-2170 MHz are employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency. Frequencies 1980-2010 MHz and 2170-2200 MHz are employed for satellite uplink and downlink.

Figure 12:
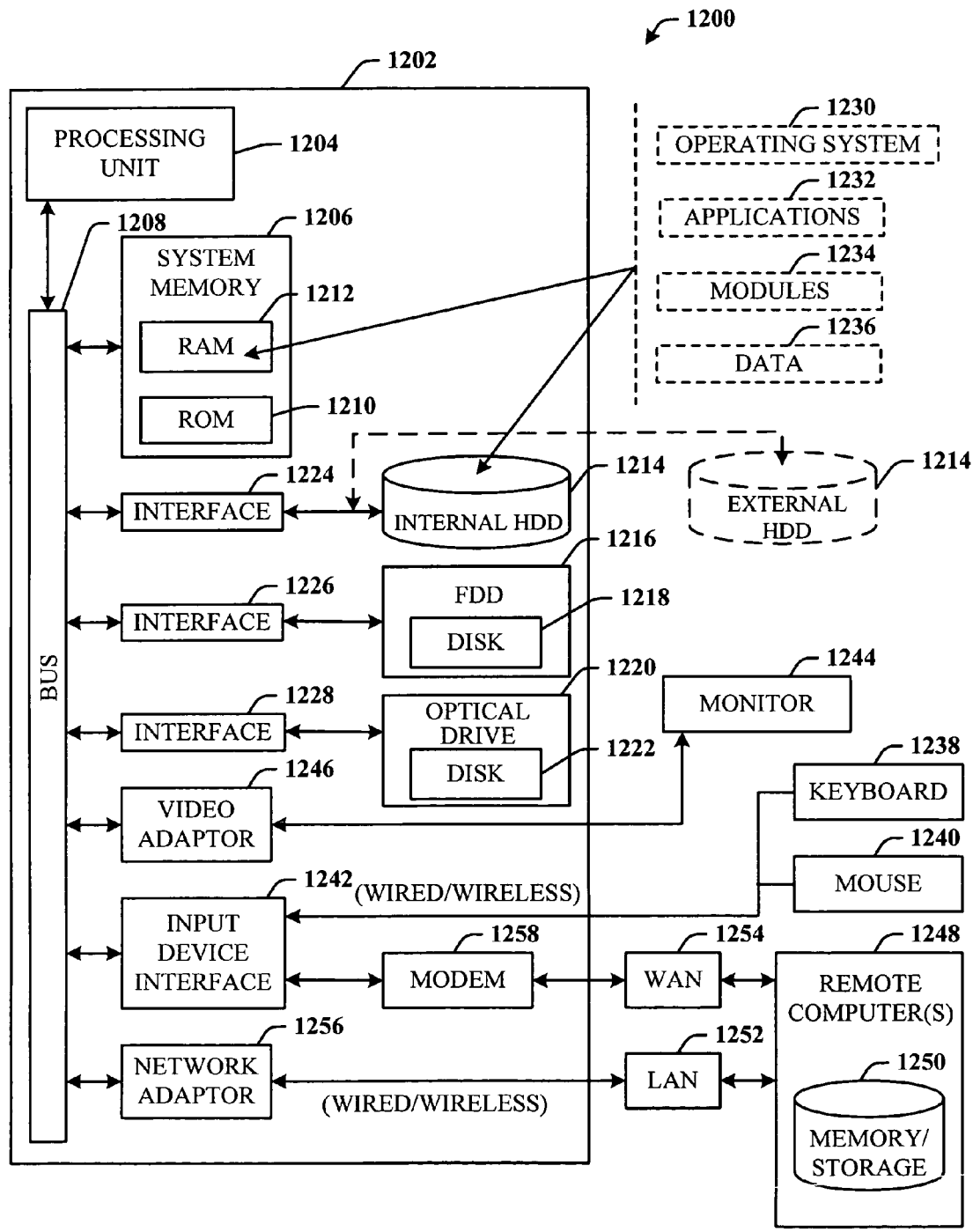
FIG. 12 illustrates a block diagram of a computer operable to execute the disclosed carrier management architecture.

Referring now to FIG. 12, there is illustrated a block diagram of a computer operable to execute the disclosed carrier management architecture. In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a cell configured to employ a first carrier;
   a traffic management component configured to monitor congestion loading for the first carrier;
   a trigger component configured to determine that the congestion loading of the first carrier meets a condition of a predetermined function; and
   a carrier component configured to dynamically enable a second carrier in the cell in response to the congestion loading meeting the condition of the predetermined function, wherein the second carrier shares a band of the first carrier, and the second carrier was not operational in the cell prior to being dynamically enabled.

2. The system of claim 1, wherein the second carrier is a same type of cellular service as the first carrier.

3. The system of claim 1, wherein the first carrier serves an outer region of the cell.

4. The system of claim 1, wherein the second carrier serves an inner-region of the cell.

5. The system of claim 1, wherein the carrier component dynamically enables the second carrier in response to the congestion loading of the first carrier meeting an additional condition of the predetermined function.

6. The system of claim 1, wherein the carrier component resides in a radio access node.

7. The system of claim 1, wherein the first carrier operates over about a 5 MHz spectrum.

8. The system of claim 1, wherein
   the trigger component is further configured to determine that congestion loading is below a predetermined threshold; and
   the carrier component is configured to dynamically disable the second carrier in response to the congestion loading being below the predetermined threshold, wherein the second carrier is not operational in the cell after being disabled.

9. The system of claim 1, wherein the congestion loading is based in part on carrier traffic associated with high data rate data.

10. The system of claim 1, wherein the carrier component resides in a radio network controller.

11. The system of claim 1, further comprising an artificial intelligence component configured to dynamically infer a condition that triggers dynamically enabling the second carrier.

12. A system, comprising:
    a traffic management component configured to monitor traffic of a first cellular service;
    a trigger component configured to monitor a set of trigger parameters associated with an amount of the traffic of the first cellular service, and determine that a trigger in the set of triggers satisfies at least one predetermined criterion; and
    a carrier component configured to dynamically enable a second cellular service in a cell configured to employ the first cellular service, in response to the trigger in the set of triggers satisfying the at least one predetermined criterion, wherein the second cellular service is not operational in the cell prior to being dynamically enabled by the carrier component.

13. The system of claim 12, wherein the second cellular service is a same type of service as the first cellular service.

14. The system of claim 12, wherein the first cellular service is configured to employ global system for mobile telecommunications technology.

15. The system of claim 12, wherein the second cellular service is configured to employ universal mobile telecommunications system technology.

16. The system of claim 12, wherein
    the trigger component is further configured to monitor an other set of trigger parameters associated with an amount of the traffic of the second cellular service, and determine that a trigger in the other set of triggers satisfies the at least one predetermined criterion;
    the carrier component is further configured to dynamically enable a third cellular service in the cell, in response to the trigger in the other set of triggers satisfying the at least one predetermined criterion, wherein the third cellular service is not operational in the cell prior to being dynamically enabled by the carrier component.

17. The system of claim 16, wherein the first cellular service and the second cellular service are configured to employ universal mobile telecommunications system technology, and the third cellular service is configured to employ a narrowband frequency re-use based service.

18. The system of claim 12, wherein the first cellular service and the second cellular service are further configured to utilize a frequency spectrum associated with the cell.

19. The system of claim 12, where the traffic management component, trigger component, and the carrier component are included in a radio access node.

20. The system of claim 12, further comprising an artificial intelligence component configured to dynamically infer a criterion that triggers dynamically enabling the second cellular service.

21. The system of claim 12, wherein
the trigger component is further configured to determine that the at least one predetermined criterion is not satisfied by at least one trigger in a set of triggers; and
the carrier component is further configured to dynamically disable the second cellular service, in response to the at least one predetermined criterion not being satisfied by at least one trigger in the set of triggers, wherein the second cellular service is not operational in the cell after being disabled by the carrier component.

22. The system of claim 12, wherein the traffic is based in part on streaming video data.

23. The system of claim 12, wherein the at least one predetermined criterion is based on a ratio of a measurement of energy-per-chip to a measurement of total received power spectral density.

24. The system of claim 12, wherein the at least one predetermined criterion is based on a received signal code power.

25. The system of claim 12, wherein the carrier component is further configured to push dual mode, global system for mobile telecommunications and universal mobile telecommunications system, traffic to the second cellular service.

26. A method comprising:
providing a first universal mobile telecommunications system carrier in a cell for data communications;
determining a congestion level of the first universal mobile telecommunications system carrier satisfies a predetermined congestion criterion; and
in response to a congestion level of the first universal mobile telecommunications system carrier satisfying the predetermined congestion criterion, automatically deploying a second universal mobile telecommunications system carrier in the cell, and
deploying an additional global system for mobile telecommunications frequency, and avoiding interference between the additional global system for mobile telecommunications frequency and the second universal mobile telecommunications system frequency, wherein the second universal mobile telecommunications system carrier and the additional global system for mobile telecommunications frequency are inactive in the cell prior to being deployed.

27. The method of claim 26, further comprising
determining the congestion level of the first universal mobile telecommunications system carrier does not satisfies the predetermined congestion criterion; and
in response to the congestion level of the first universal mobile telecommunications system carrier not satisfying the predetermined congestion criterion, automatically dropping the second universal mobile telecommunications system carrier based on the predetermined congestion criterion, wherein the second universal mobile telecommunications system carrier is inactive in the cell prior after being dropped.

28. The method of claim 26, wherein the congestion criterion is based at least in part on a set of common pilot channels.

29. The method of claim 26, wherein the automatically deploying includes automatically deploying the second universal mobile telecommunications system carrier in an inner-region of the cell.

30. The method of claim 26, wherein the deploying the second universal mobile telecommunications system carrier includes deploying the second universal mobile telecommunications system carrier on a site-by-site basis.

31. The method of claim 26, further comprising deploying the first universal mobile telecommunications system carrier, and the additional global system for mobile telecommunications carrier in an outer region of the cell.

32. The method of claim 26, further comprising deploying the first universal mobile telecommunications system carrier, a second global system for mobile telecommunications carrier, and a third global system for mobile telecommunications carrier.

33. The method of claim 26, further comprising assigning a user to the second universal mobile telecommunications system carrier before the first universal mobile telecommunications system carrier.

34. The method of claim 26, further comprising assigning a user to the first universal mobile telecommunications system carrier before the second universal mobile telecommunications system carrier.

35. The method of claim 26, further comprising assigning a user to a global system for mobile telecommunications enhanced carrier.

36. A non-transitory computer readable storage medium comprising computer executable instructions that, in response to execution by a computing system, cause the computing system to perform operations, comprising:
employing a first carrier in a cell for data communications;
detecting a level of congestion in the first carrier based in part on streaming data;
determining that the level of congestion meets a condition of a function; and
in response to the level of congestion meeting the condition of the function, deploying an other carrier in the cell, wherein the other carrier is activated in the cell upon being deployed.

37. The system of claim 36, further comprising:
determining that the level of congestion does not exceed a predetermined threshold; and
in response to the level of congestion not exceeding the predetermined threshold, removing the other carrier, wherein the other carrier is deactivated in the cell upon being removed.

38. The A non-transitory computer readable storage medium of claim 36, wherein the level of congestion is based at least in part on a measurement of carrier power.

39. The non-transitory computer readable storage medium of claim 36, further comprising triggering an assignment of a user to the first carrier by performing a soft handover.

40. The non-transitory computer readable storage medium of claim 12, wherein the carrier component executes in a radio network controller.

* * * * *